July 22, 1958  J. H. ROETHEL  2,844,405
VEHICLE WINDOW GUIDING MEANS
Filed March 14, 1956  3 Sheets-Sheet 2
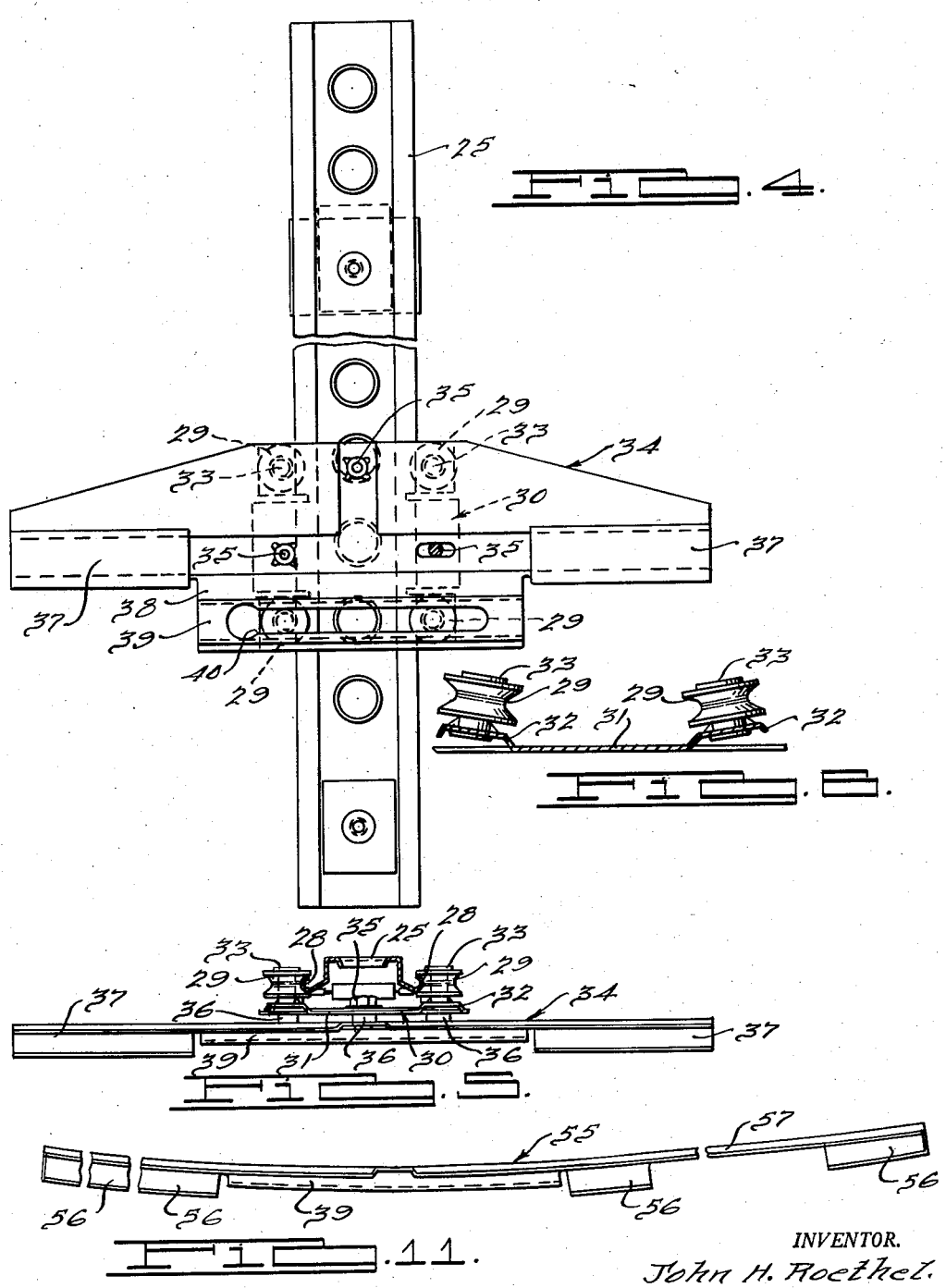
INVENTOR.
John H. Roethel.
BY
John Joseph Roethel
ATTORNEY.

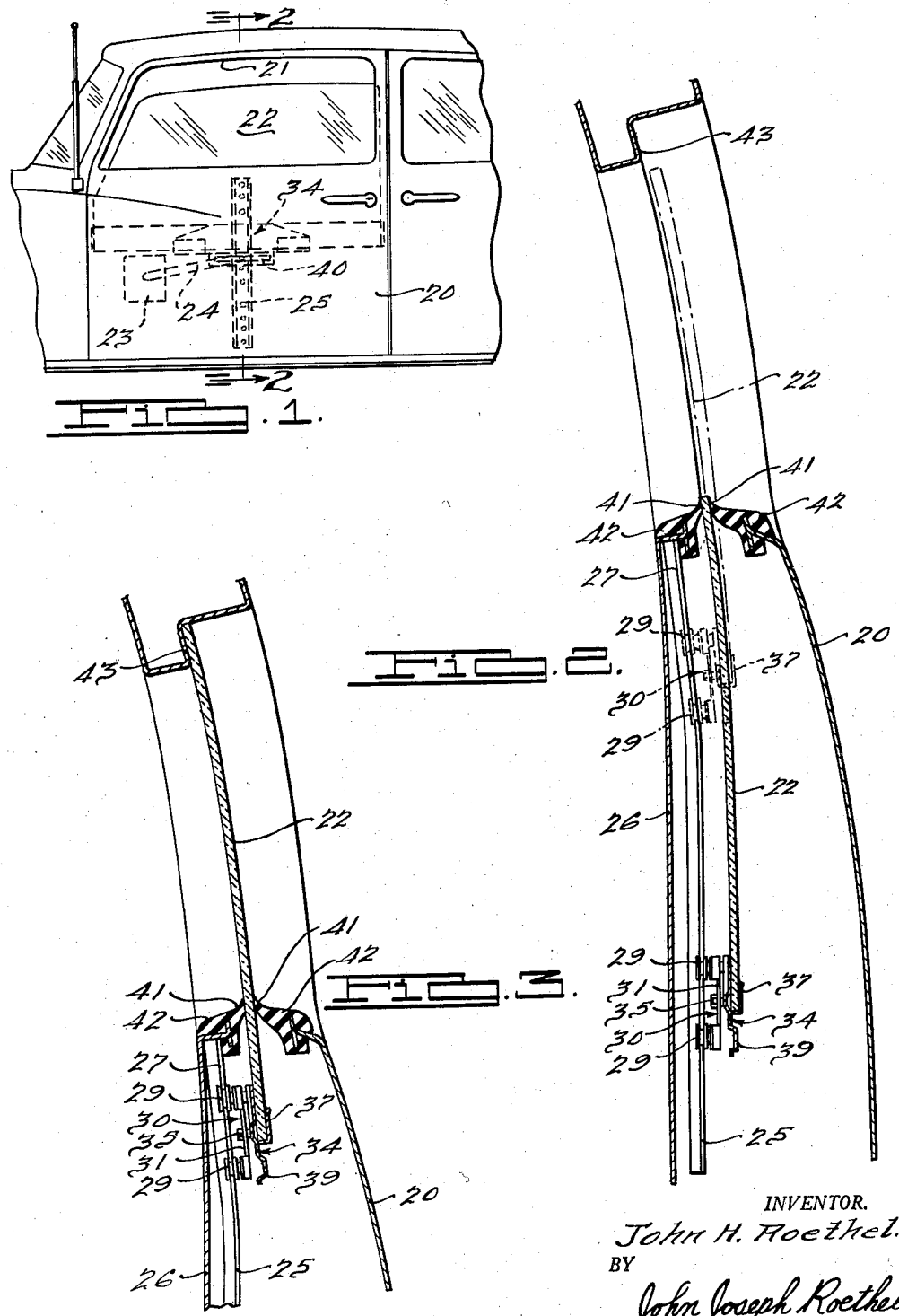
July 22, 1958     J. H. ROETHEL     2,844,405
VEHICLE WINDOW GUIDING MEANS
Filed March 14, 1956     3 Sheets-Sheet 1
INVENTOR.
John H. Roethel.
BY John Joseph Roethel
ATTORNEY.

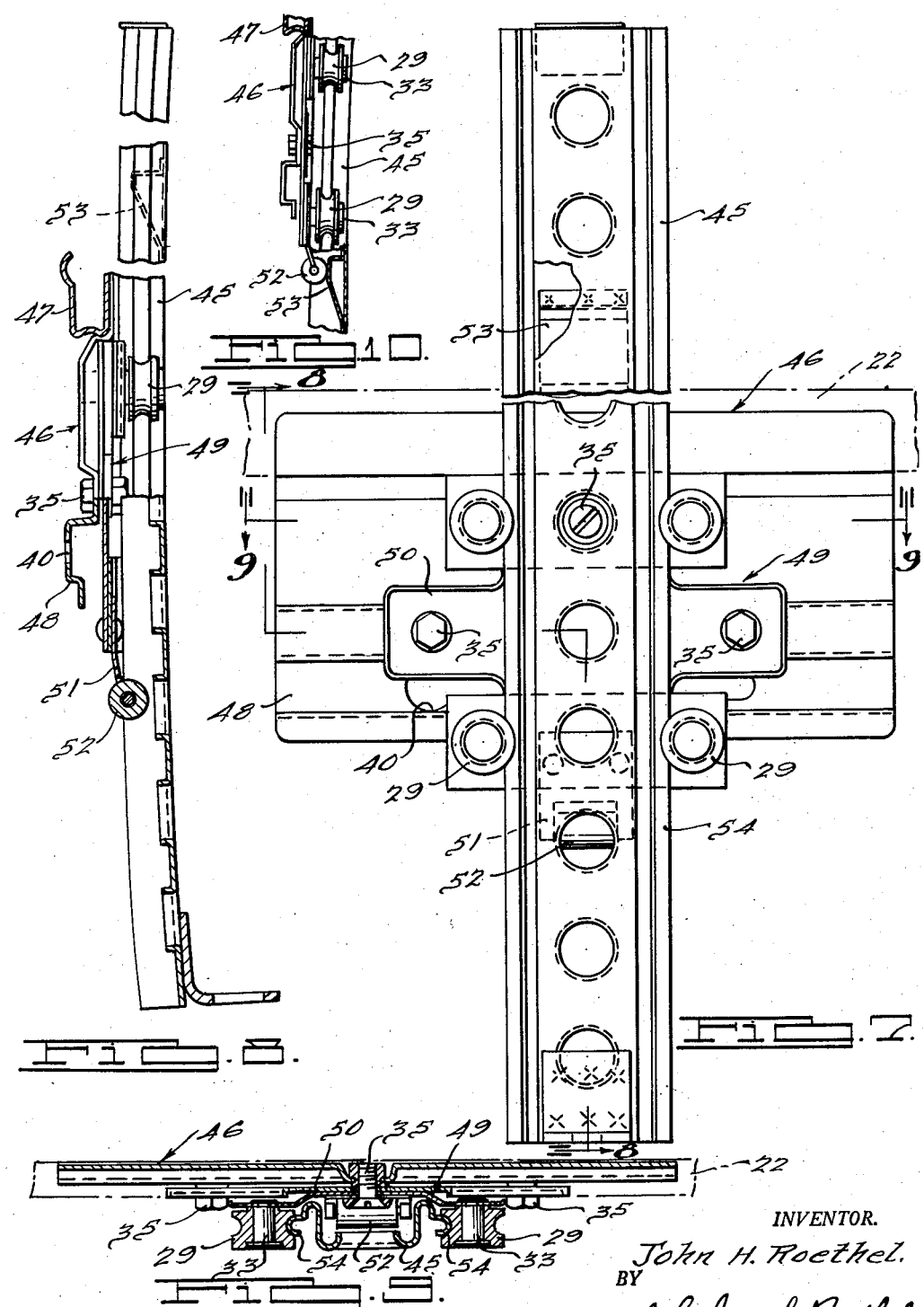

United States Patent Office 2,844,405
Patented July 22, 1958

2,844,405

VEHICLE WINDOW GUIDING MEANS

John H. Roethel, Coral Gables, Fla.

Application March 14, 1956, Serial No. 571,455

6 Claims. (Cl. 296—44.5)

This invention relates to means for guiding and controlling the movements of glass or transparent panels or the like of windows, particularly windows of automobiles in which the transparent panels or panes are adapted to be raised and lowered. The invention is especially useful as applied to the window structure for a vehicle body having a window frame provided with a window well formed between inner and outer body or door panels within which the mechanism of the present invention as well as the window regulator mechanism are installed and concealed from view.

Having successfully provided the modern automobile with curved windshields and curved rear windows, the automobile designers are proposing that the transparent panels or panes found in the vehicle doors be changed from the conventional flat panel to a curved or spherical segment shape in order to conform to advanced streamlining contours and concepts. Such treatment of the transparent panels makes it necessary to discard the conventional procedure of guiding and providing a weather tight seal around the panel edges by using felt lined channels. It has been suggested that the side channels be eliminated and that the lifting and lowering mechanism be the sole means for guiding the window. It has been proposed to accomplish this by providing an adjusting device comprising a guide rail on which a cross piece is guided by a sliding block, the bottom edge of the panel or pane being cemented to the cross piece. The proposed adjusting device can only be used with straight guides or those of regular circular arched outline and cannot be used with guides of irregularly curved shape. Thus, the possibilities for application are restricted, which is a disadvantage. A further objection is that the window panels are not held with sufficient tightness. Thus, the panels are prone to rattle as the vehicle is driven about; and the panels are not weather tight.

It is an object of the present invention to provide a vehicle window supported and guided for raising and lowering movements without the use of side guide rails or channels but yet which will be tightly held in a closed position by a pressure means effective to make the window pane weather tight and rattle proof.

To accomplish the foregoing objective the present invention embraces the principle of imparting to the pane a tilting movement adapted to tightly press the pane against a simple rubber seal carried in the window frame. In its illustrated embodiments the present invention provides for the panel to be fixed to the resilient web of a sliding block guided in the window casing on a rail running parallel with the line of movement of the pane, the end of the rail being provided with means tilting the sliding block towards the window joint. The tilting means, as soon as it becomes operative, results in the pane being tightly pressed to the frame when the pane is in its closed or final position.

In accordance with one embodiment of the present invention the sliding block comprises a semi-rigid member having tongue portions at the upper and lower ends thereof. The tongue portions are adapted to support a pair of upper and a pair of lower rollers. The rollers are adapted to contact track edges of a substantially vertically extending rail, each pair of rollers embracing opposite sides of the rail. In the present embodiment, the upper end of the rail is inclined slightly at an angle towards the contact face of the transparent panel or pane. Accordingly, as the transparent panel or pane is moved upwardly it will in its last degrees of movement be also moved bodily inwardly towards its frame to provide the tight fit necessary to prevent a good weather seal.

In a further embodiment of the present invention, the guide rail is not provided with any angularly inclined portion but it is provided with a wedge shaped ascent or incline and the sliding block is provided with a tail portion supporting a roll adapted to run up this wedge shaped ascent in the last degrees of movement of the window. This has the effect of tilting the sliding block inwardly towards the contact face of the window.

Further objects, advantages and the features of construction embodying the present invention will appear in the following description and appended claims, reference being had to the accompanying drawings forming a part of the specification wherein like reference characters designate corresponding parts in the several views.

Fig. 1 is a fragmentary elevation of a vehicle body illustrating the mounting of a guiding device according to the present invention in one door thereof, and including a diagrammatic representation of a window lifting and lowering mechanism operatively associated with the guiding device.

Fig. 2 is a sectional view taken substantially on the line 2—2 of Fig. 1 illustrating the transparent panel or pane in lowered position in solid outline and in partially raised position in dot and dash outline.

Fig. 3 is a view in part similar to Fig. 2 illustrating the transparent panel or pane in completely raised position.

Fig. 4 is a side elevation of the guide device embodying one form of the present invention.

Fig. 5 is a top view of Fig. 4.

Fig. 6 is a cross sectional view of the sliding block structure illustrating the mounting of the rollers on the tongue portions thereof.

Fig. 7 is a side elevation illustrating the guide rail and cross piece embodying the second embodiment of the present invention.

Fig. 8 is a sectional view taken substantially through line 8—8 of Fig. 7 looking in the direction of the arrows.

Fig. 9 is a sectional view taken substantially through line 9—9 of Fig. 7 looking in the direction of the arrows.

Fig. 10 is a view in part similar to Fig. 8 illustrating the mechanism in its uppermost position.

Fig. 11 is a view illustrating a modified channel adapted to be used with transparent panels or panes which are curved longitudinally as well as vertically.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there are illustrated, by way of example, particular embodiments of the present invention as applied to the doors of an automobile body. The automobile body door 20 comprises a door frame of any suitable construction formed with a window opening 21 which is adapted to be closed by means of a substantially vertically slidable glass or other transparent panel 22.

The window panel 22 is adapted to be raised and lowered by means of a suitable window regulator mechanism 23 mounted within the window well below the main window opening 21. In the present instance the window regulator mechanism 23 is of the type having a single arm 24.

As shown in Figs. 2 and 3, the transparent panel 22 is illustrated as being convexly curved to correspond to the shape of the vehicle door 20. With reference to Fig. 1, it will be noted that the window opening 21 is not provided with any side channels or guide rails. The transparent panel 22 is adapted to be guided during its upward and downward movements solely by a single guide rail 25. The guide rail 25 is adapted to be secured to the inner panel 26 of the door 20 in any convenient manner and is located substantially centrally of the door, as shown in Fig. 1. It will be noted in Fig. 2 that the rail 25 extends parallel to the inner panel 26 for a substantial height vertically and then has an upper portion 27 angularly inclined toward the inner panel. The guide rail 25 is provided with two curled edges 28 on opposite sides thereof forming tracks adapted to be engaged by rollers 29 on a slide block or carriage member 30. The carriage member 30 comprises a plate 31 having tongue portions 32 formed thereon. It will be noted in Fig. 6 that the tongue portions 32 are slightly angularly inclined relative to the plane of the plate portion 31 so that the rollers 29 journalled on pivot studs 33 carried by the tongue portions 32 are tilted inwardly toward each other. As shown in Fig. 4 there are two upper and two lower rollers 29 straddling the guide rail 25, the span of the rail between its roller engageable or track edges 28 being sufficient to spread the tilted rollers 29 so that their axes of rotation are substantially parallel. The rollers 29 thus embrace the guide rail 25 with sufficient resilient tightness to ensure against looseness that might permit rattling. The channel shape of the rail 25 also provides some degree of lateral resiliency in the rail 25 while at the same time providing a rail of sufficient longitudinal rigidity.

The carriage member 30 has secured thereto a cross piece 34. As best seen in Fig. 4, the cross piece 34 extends laterally across the guide rail 25. The cross piece is secured to the carriage member 30 by three bolts 35. The cross piece is spaced from the carriage member by spring washers 36 carried by the bolts 35, as is best seen in Fig. 5. It will be understood that the spring washers 36 are relatively rigid. The cross piece 34 is provided at each lateral end thereof with an upwardly turned substantially U-shaped channel 37. The channel portions 37 are adapted to receive the lower edge of the transparent panel or pane 22. Intermediate the flanges 37 the cross piece is provided with a depending leg portion 38 having a horizontally extending channel 39 formed therein. The channel 39 is provided in the vertical wall thereof with a longitudinally extending slot 40 adapted to receive the connecting means (not shown) for slidably connecting the swinging arm 24 of the window regulator mechanism 23 to the cross piece.

The operation of the present embodiment may be best understood with reference to Figs. 2 and 3. In Fig. 2, in solid outline, is shown the carriage member 30 in its lowermost position. The upper edge of the glass or transparent panel 22 rests between the lips 41 of rubber sealing strips 42. Upon operation of the window regulator mechanism 23, the carriage member 30 and the transparent panel 22 will rise in a substantially vertical direction but in a direction away from the angularly inclined frame 43 of the window opening 21. The movement away from the frame 43 continues until the carriage member rollers 29 enter on the inclined upper portion 27 of the rail 25, as shown in dotted outline in Fig. 2. From this point on, the movement of the transparent panel 22 continues upward but is also toward the frame 43 until the final position shown in Fig. 3 is reached. In this position the transparent panel 22 is actually exerting pressure on the frame 43 since the effective travel of the carriage member 30 toward the inner panel of the door is in excess of that required merely to bring the glass or panel 22 in contact with the frame 43.

The inherent flexibility of the carriage member 30 resulting from its metal plate 31 construction and the manner in which the rollers 29 and the cross piece 34 are secured thereto provide the necessary flexibility to prevent undue stress being concentrated on any particular portion of the transparent panel or pane 22 even though it is exerting pressure against the frame 43.

Although not shown, it will be understood that the frame 43 might be provided with a seal or cushion pad to further ensure a tight anti-rattle and waterproof seal.

The embodiment of Figs. 7 to 10 inclusive illustrates a second method by which the transparent panel or pane 22 may, in its final degrees of upward travel, be pressed against the frame 43. In this embodiment the guide rail 45 is illustrated as having a slight but substantially uniform curvature, see Fig. 8. The cross piece 46 is shown as being of substantially rectangular shape having the transparent panel receiving channel 47 located at the upper end thereof. At its lower section the cross piece 46 is provided with the horizontally extending channel section 48 provided with the slot 40 to which the swinging arm 24 of the window regulator is adapted to be connected.

In the present embodiment the carriage member 49 plate portion 50 to which the cross piece is attached has riveted thereto a downwardly extending appendage or tail piece 51 slotted to receive a roller 52, the roller being journalled thereon in any convenient manner. This roller 52 is adapted to cooperate with a wedge shaped ascending surface 53 located between the guide rail tracks 54 near the upper end of the guide rail.

When the transparent panel or pane 22 is at its lowermost position, corresponding to the position shown in solid outline, the roller 52 merely travels between the tracks 54 without being in contact with anything. As the transparent panel or pane 22 is raised towards its uppermost position, the roller 52 will travel up the inclined surface 53 causing the carriage member 49 and thereby the transparent panel or pane 22 to be tilted toward the door frame 43. It will be understood that the incline 53 may be placed at any convenient position near the upper end of the guide rail 45 and may be as gradual or as abrupt an incline as desired.

Should the transparent panel or pane 22 be curved longitudinally as well as vertically, the cross piece 55 may be provided for use with either embodiment of the invention. It is substantially similar to the cross piece 34 except for the radius of curvature noted when seen from the top or the bottom. It will also be noted that the cross piece is provided with additional flange portions 56 interrupted by recesses 57. The recesses provide the necessary flexibility to permit the cross piece to be curved throughout its longitudinal length making it easier to fit the curve of the transparent panel or pane.

I claim:
1. In a vehicle body having a window opening defined by a frame structure curved from the bottom of said opening to the top thereof, and a well for receiving a curved window panel movable into and out of said opening, the combination of a unitary upright track means mounted intermediate and substantially parallel to the longitudinal edges of said well, a carrier member secured to the lower edge of said window panel, antifriction means carried by said carrier member engaging the side surfaces of said track means at vertically spaced points of contact to provide stability as said panel is moved up and down, and coacting means on said carrier member and track means operative to change the angu- lar inclination of said window panel laterally relative to said frame structure after predetermined movement of said carrier member along said track means.

2. In a vehicle body having a window opening defined by a frame structure curved from the bottom of said opening to the top thereof, and a well for receiving a curved window panel movable into and out of said opening, the combination of a unitary vertically mounted track means secured within said well, said track means being substantially centrally located beneath said opening, a carrier member secured to the lower edge of said window panel centrally thereof, antifriction means carried by said carrier member engaging the side surfaces of said track means at vertically spaced points of contact to provide longitudinal stability of said panel as the latter is moved up and down, and coacting means on said carrier member and track means operative to change the angular inclination of said window panel laterally relative to said frame structure after predetermined movement of said carrier member along said track means.

3. In a vehicle body having a window opening defined by a frame structure curved from the bottom of said opening to the top thereof, and a well for receiving a curved window panel movable into and out of said opening, the combination of a unitary vertically extending track means mounted within said well, said track means being substantially centrally located beneath said opening, said track means being provided with rail surfaces at each side edge thereof, vertically spaced pairs of roller means journalled on said carrier member and engaging said rail surfaces, the vertical spacing of the points of engagement of said rail surfaces by said roller means providing longitudinal stability as said panel is moved up and down, and coacting means on said carrier member and track means operative to change the angular inclination of said window panel laterally relative to said frame structure after predetermined movement of said carrier member along said track means.

4. In a vehicle body having a window opening defined by a frame structure curved from the bottom of said opening to the top thereof, and a well for receiving a curved window panel movable into and out of said opening, the combination of a unitary upright track means mounted intermediate and substantially parallel to the longitudinal edges of said well, a carrier member secured to the lower edge of said window panel, antifriction means carried by said carrier member engaging the side surfaces of said track means at vertically spaced points of contact to provide stability as said panel is moved up and down, said track means having an angularly inclined portion effective to change the angular inclination of said window panel relative to said frame structure upon movement beyond said predetermined raised position to bring said panel into contact with said frame structure upon said panel reaching its uppermost position.

5. In a vehicle body having a window opening defined by a frame structure curved from the bottom of said opening to the top thereof, and a well for receiving a curved window panel movable into and out of said opening, the combination of a unitary upright track means mounted intermediate and substantially parallel to the longitudinal edges of said well, a carrier member secured to the lower edge of said window panel, antifriction means carried by said carrier member engaging the side surfaces of said track means at vertically spaced points of contact to provide stability as said panel is moved up and down, said panel during such movement being substantially out of contact with said frame structure, said track means having a further portion effective after said predetermined raised position is reached to guide said panel upwardly and bodily toward said frame structure so as to bring said panel into contact with said frame structure upon said panel being raised to substantially its uppermost position.

6. In a vehicle body having a window opening defined by a frame structure curved from the bottom of said opening to the top thereof, and a well for receiving a curved window panel movable into and out of said opening, the combination of a unitary upright track means mounted intermediate and substantially parallel to the longitudinal edges of said well, a depending carrier member secured to the lower edge of said window panel, antifriction means carried by said carrier member engaging the side surfaces of said track means at vertically spaced points of contact to provide stability as said panel is moved up and down, said panel during such movement being substantially out of contact with said frame structure, and coacting means on said track means and said carrier member operative after said predetermined raised position is reached to bodily shift said panel toward said frame structure so as to bring said panel into contact with said frame structure upon said panel being raised to substantially its uppermost position.

References Cited in the file of this patent

UNITED STATES PATENTS

| | | |
|---|---|---|
| 1,826,865 | Carr | Oct. 13, 1931 |
| 2,001,778 | Field | May 21, 1935 |
| 2,390,271 | Rappl et al. | Dec. 4, 1945 |
| 2,763,508 | Gelfand et al. | Sept. 18, 1956 |